H. F. SHAW.
Locomotive-Engines.
No. 221,426. Patented Nov. 11, 1879.
Fig. 1.
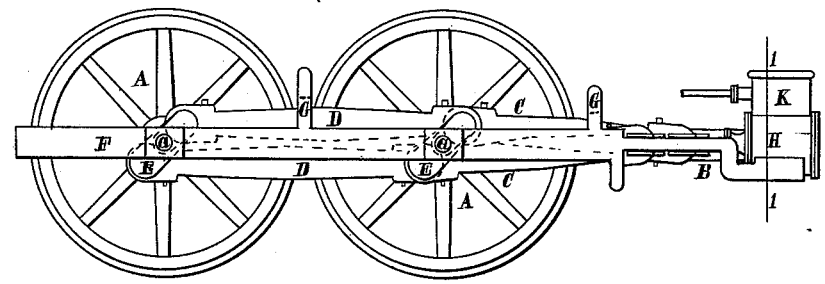
Fig. 2.
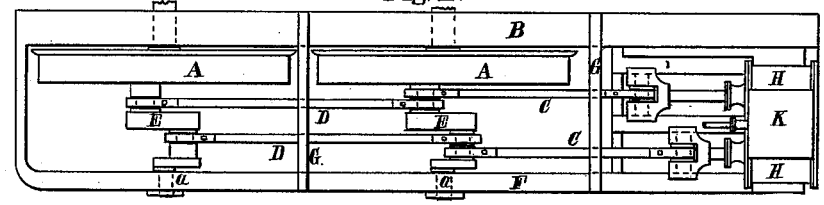
Fig. 3.          Fig. 4.          Fig. 5.
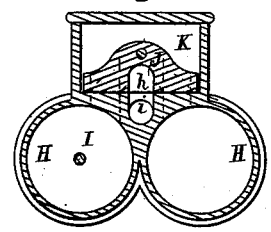 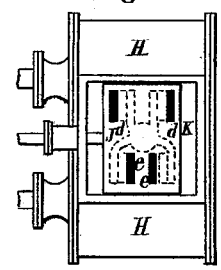 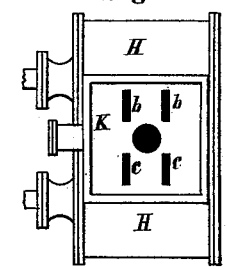
Fig. 6.
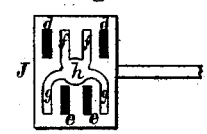
Attest:
H. E. Bathrick.
H. Gray.
Inventor:
Henry F. Shaw,
per Edw. Dummer
Atty.
N. PETERS, PHOTO-LITHOGRAPHER, WASHINGTON, D. C.

UNITED STATES PATENT OFFICE.

HENRY F. SHAW, OF BOSTON, MASSACHUSETTS.

IMPROVEMENT IN LOCOMOTIVE-ENGINES.

Specification forming part of Letters Patent No. 221,426, dated November 11, 1879; application filed May 17, 1879.

*To all whom it may concern:*

Be it known that I, HENRY F. SHAW, of Boston, in the county of Suffolk and State of Massachusetts, have invented a new and useful Improvement in Locomotive-Engines, which improvement is fully set forth in the following specification, reference being had to the accompanying drawings.

My invention relates to a locomotive and other engines in which the weight of the crank, crank-pin, and connecting-rod on a driving-wheel are counterbalanced by the use of a weight constructed and applied to the wheel in such a manner that it shall bear the same relation to the wheel and move in the same manner as the weight to be balanced—that is, in which a double crank and two connecting-rods are used to each driving-wheel, and two parallel rods to each pair of wheels on the same side; and, as far as the valve is concerned, my invention relates to any engine in which two cylinders are employed having pistons moving in opposite directions.

The improvements will be fully hereinafter described, and specifically pointed out in the claims, a preliminary description being, therefore, deemed unnecessary.

In the drawings, Figure 1 is a side view of so much of a locomotive embodying my invention as serves for illustration. Fig. 2 is a plan view of the parts shown in Fig. 1. Fig. 3 is a section of the steam-cylinders, valve-chest, and valve, taken on line 1 1 in Fig. 1. Fig. 4 is a plan view of the steam-cylinders, valve-chest, and valve, the cap or cover of the valve-chest being removed. Fig. 5 is a plan of the steam-cylinders and valve-chest, the cover of the latter and the valve being removed. Fig. 6 is a view of the under side of the valve. The four latter figures are drawn on a larger scale than Figs. 1 and 2.

A A are two driving-wheels, as used on one side of a locomotive. The axles thereof have bearings supported by the frame-piece B. These wheels are balanced by having two connecting-rods, C C, and two parallel rods, D D, each wheel having a double crank, E. By this means the wheels are perfectly balanced, it having been heretofore demonstrated that a weight fixed in position in reference to the wheel will not balance a weight changing position in reference to the wheel, but that the balancing must be done by having the counterbalance-weight under the same conditions as the weight of the connecting-rod or parallel rod.

I support the outer end of each double crank E by a stud, *a*, formed thereon concentric with the axle, and held by a rail, F, outside of the wheels. Such bearing insures steadiness in the movement of the crank, while a lighter crank may be used than could otherwise be employed. The rail F is also a protection for the machinery, and contributes to the symmetry and strength of the frame of the locomotive.

The rail F is not only joined at either end to the main frame-work, but I also connect the same to the frame-piece B by stays or guards G. These are designed and located as guards, that in case the moving connections—as the parallel or connecting rod—break or become disconnected, they will prevent the same from flying upward to cause further and more serious damage.

In addition to counterbalancing the weight on the wheels, I now balance the pressure of the motive force exerted on the driving-wheels of a locomotive by the use of two steam-cylinders, H H, for the wheels on one side, each cylinder having its own piston. The connecting-rods C are so joined to the double crank that the pistons travel in opposite directions one from the other.

It needs no argument to show that the employment of two pistons operating in this manner will cause the steam force to be exerted directly in turning the wheels, and that the frame-work of the engine will be relieved of most of the strain that exists where only one cylinder and piston is used. Hence the frame-work may be made much lighter. Each cylinder and connecting-rod, is, of course, proportionally of less size than where one is used.

I use a single slide-valve, J, in a steam-chest, K, for both cylinders. The steam-passages in my valve are located, in reference to each other and to the steam-ports to the cylinders, as follows: *b b* are the ports to the ends of one cylinder, and *c c* the ports to the ends of the other cylinder. The supply-passages in the valve are *d d* for the ports *b b*, and *e e* for the ports *c c*. The ports to the one cylinder being on a line with those to the other cylinder, as shown, the supply-passages in the valve J are nearer together for one cylinder than for the other. The effect of this arrangement is such (and this is the important feature of this part of my invention) that the steam-passages in the valve enter upon and leave the steam-ports to the cylinders upon the same side for one cylinder that they do for the other cylinder, so that the "lap" and "lead" will always be the same for both cylinders.

The same principle is carried out in the position of the exhaust-passages, *f f* being those in the valve for one cylinder, and *g g* for the other cylinder. These open into a common exhaust-passage, *h*, in the valve, which opens to the common exhaust-passage *i*, leading to the one exhaust-pipe.

My slide-valve is moved as an ordinary slide-valve for one cylinder.

I claim as my invention.

1. The combination, with the main frame-work B of a locomotive-engine, of a guard-rail, F, attached at its ends to the said frame-work, and extending outwardly or laterally therefrom, and the double crank or cranks E, having bearings in the said rail and the frame-work of the locomotive, substantially as and for the purposes described.

2. The combination, with a locomotive-engine and the guard-rail F, extending outwardly therefrom and forming bearings for the double crank or cranks of the transverse stays and guards G, attached to the rail and to the locomotive frame-work, connecting the rail to said frame-work, substantially as and for the purpose described.

3. The combination, in a locomotive-engine, of two driving-wheels, the double balanced cranks E, the crank-pins, and the two parallel rods D, mounted on the crank-pins of the cranks, for counterbalancing the weight on the wheels, with the two cylinders, two pistons moving in opposite directions, and a single slide-valve, all constructed and arranged substantially as described, for balancing the pressure of the motive force exerted on the driving-wheels, as set forth.

4. The combination, with the two cylinders H and valve-chest K, provided with ports *b*, having direct connection with the ends of one cylinder, and ports *c*, having direct connection with the ends of the other cylinder, of a single slide valve, J, having steam-supply passages *d d* and *e e* and exhaust-passages *f* and *g*, one set of the passages in the valve being nearer together for the ports of one cylinder than for the other, whereby the steam-passages in the valve enter upon and leave the steam-ports to the cylinders upon the same side from one cylinder that they do for the other cylinder, substantially as and for the purpose described.

HENRY F. SHAW.

Witnesses:
   EDW. DUMMER,
   LOUIS COHEN.